(12) United States Patent
Hua et al.

(10) Patent No.: US 11,087,201 B2
(45) Date of Patent: Aug. 10, 2021

(54) NEURAL ARCHITECTURE SEARCH USING A PERFORMANCE PREDICTION NEURAL NETWORK

(71) Applicant: Google LLC, Mountain View, CA (US)

(72) Inventors: Wei Hua, Palo Alto, CA (US); Barret Zoph, Sunnyvale, CA (US); Jonathon Shlens, San Francisco, CA (US); Chenxi Liu, Baltimore, MD (US); Jonathan Huang, Seattle, WA (US); Jia Li, Palo Alto, CA (US); Fei-Fei Li, Stanford, CA (US); Kevin Patrick Murphy, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/861,491

(22) Filed: Apr. 29, 2020

(65) Prior Publication Data
US 2020/0257961 A1 Aug. 13, 2020

Related U.S. Application Data

(63) Continuation of application No. PCT/US2018/063293, filed on Nov. 30, 2018.
(Continued)

(51) Int. Cl.
*G06N 3/04* (2006.01)
*G06K 9/62* (2006.01)
(Continued)

(52) U.S. Cl.
CPC ............. *G06N 3/04* (2013.01); *G06K 9/6256* (2013.01); *G06K 9/6263* (2013.01); *G06N 3/063* (2013.01); *G06N 3/08* (2013.01)

(58) Field of Classification Search
None
See application file for complete search history.

(56) References Cited

U.S. PATENT DOCUMENTS

| 5,904,227 A | 5/1999 | Whitehall et al. |
| 2017/0243114 A1* | 8/2017 | Kurata ................ G06N 3/0472 |

(Continued)

FOREIGN PATENT DOCUMENTS

| JP | 2004-192584 | 7/2004 |
| JP | 2018-195314 | 12/2018 |

OTHER PUBLICATIONS

Baker et al, "Designing Neural Network Architectures Using Reinforcement Learning", Mar. 2017, arXiv, all pages (Year: 2017).*
(Continued)

*Primary Examiner* — Daniel C Puentes
(74) *Attorney, Agent, or Firm* — Fish & Richardson P.C.

(57) ABSTRACT

A method for determining an architecture for a task neural network configured to perform a particular machine learning task is described. The method includes obtaining data specifying a current set of candidate architectures for the task neural network; for each candidate architecture in the current set: processing the data specifying the candidate architecture using a performance prediction neural network having multiple performance prediction parameters, the performance prediction neural network being configured to process the data specifying the candidate architecture in accordance with current values of the performance prediction parameters to generate a performance prediction that characterizes how well a neural network having the candidate architecture would perform after being trained on the particular machine learning task; and generating an updated set of candidate architectures by selecting one or more of the candidate architectures in the current set based on the
(Continued)

performance predictions for the candidate architectures in the current set.

20 Claims, 4 Drawing Sheets

Related U.S. Application Data (60) Provisional application No. 62/593,213, filed on Nov. 30, 2017.

(51) Int. Cl.
   *G06N 3/063* (2006.01)
   *G06N 3/08* (2006.01)

(56) References Cited

U.S. PATENT DOCUMENTS

2018/0032505 A1* 2/2018 Hoetzer ............... G06Q 40/08
2019/0138901 A1* 5/2019 Meyer .................. G06N 3/04

OTHER PUBLICATIONS

Wang et al, "A Long-Short Term Memory Recurrent Neural Network Based Reinforcement Learning Controller for Office Heating Ventilation and Air Conditioning Systems", Aug. 2017, Processes 2017 5, 46., all pages (Year: 2017).*
PCT International Preliminary Report on Patentability in International Application No. PCT/US2018/063293, dated Jun. 2, 2020, 13 pages.
Anonymous, "Progressive Neural Architecture Search" CVPR, 2018, 10 pages.
Brock et al, "One-Shot Model Architecture Search through HyperNetworks" arXiv, Mar. 4, 2019, 21 pages.
Liu et al, "Progressive Neural Architecture Search" arXiv, 2017, 11 pages.
PCT International Search Report and Written Opinion in International Application No. PCT/US2018/063293, dated Mar. 19, 2019, 19 pages.
Zoph et al, "Learning Transferable Architectures for Scalable Image Recognition" arXiv, Oct. 2017, 13 pages.
IN Office Action in Indian Application No. 202027016507, dated May 28, 2021, 5 pages (with English translation).
JP Office Action in Japanese Application No. 2020-529555, dated Jun. 21, 2021, 7 pages (with English translation).

* cited by examiner

NEURAL ARCHITECTURE SEARCH USING A PERFORMANCE PREDICTION NEURAL NETWORK

CROSS REFERENCE TO RELATED APPLICATIONS

This application is a continuation of International Application No. PCT/US2018/063293, filed Nov. 30, 2018, which is a non-provisional of and claims priority to U.S. Provisional Patent Application No. 62/593,213, filed on Nov. 30, 2017, the entire contents of which are hereby incorporated by reference.

BACKGROUND

This specification relates to determining architectures for neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short-term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that determines a network architecture for a task neural network that is configured to perform a particular machine learning task.

The subject matter described in this specification can be implemented in particular embodiments so as to realize one or more of the following advantages. By determining the architecture of a task neural network using the techniques described in this specification, the system can determine a network architecture that achieves or even exceeds state of the art performance on any of a variety of machine learning tasks, e.g., image classification or another image processing task. Additionally, the system can determine the architecture of the task neural network (for example, determining an output cell that is repeated throughout the architecture of the task neural network) in a specific manner that is much more computationally efficient than existing techniques, i.e., that consumes many fewer computational resources than existing techniques. In particular, many existing techniques rely on evaluating the performance of a large number of candidate architectures by training a network having the candidate architecture. This training is both time consuming and computationally intensive. The described techniques greatly reduce the amount of instances of the task neural network that need to be trained by instead employing a performance prediction neural network that effectively predicts the performance of a trained network having a candidate architecture, i.e., without needing to actually train a network having the candidate architecture. In some described implementations, this approach is combined with other resource-conserving approaches, i.e., techniques that effectively limit the search space of possible architectures of the final output architecture without adversely affecting and, in some cases, even improving the performance of the resulting task neural network that includes multiple instances of the output architecture, to achieve even greater computational efficiency. For example, other resource-conserving approaches may include learning the architecture of a convolutional cell or other type of cell that includes multiple blocks of operations, and then repeating the learned cell according to a predetermined template to generate the architecture of the task neural network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural architecture search system implemented as computer programs on one or more computers in one or more locations that determines a network architecture for a task neural network. The task neural network is configured to perform a particular machine learning task.

In general, the task neural network is configured to receive a network input and to process the network input to generate a network output for the input.

In some cases, the task neural network is a convolutional neural network that is configured to receive an input image and to process the input image to generate a network output for the input image, i.e., to perform some kind of image processing task.

For example, the task may be image classification and the output generated by the neural network for a given image may be scores for each of a set of object categories, with each score representing an estimated likelihood that the image contains an image of an object belonging to the category.

As another example, the task can be image embedding generation and the output generated by the neural network can be a numeric embedding of the input image.

As yet another example, the task can be object detection and the output generated by the neural network can identify locations in the input image at which particular types of objects are depicted.

In some other cases, the task can be video classification and the task neural network is configured to receive as input a video or a portion of a video and to generate an output that determines what topic or topics that the input video or video portion relates to.

In some other cases, the task can be speech recognition and the task neural network is configured to receive as input audio data and to generate an output that determines, for a given spoken utterance, the term or terms that the utterance represents.

In some other cases, the task can be text classification and the task neural network is configured to receive an input text segment and to generate an output that determines what topic or topics an input text segment relates to.

Figure 1:
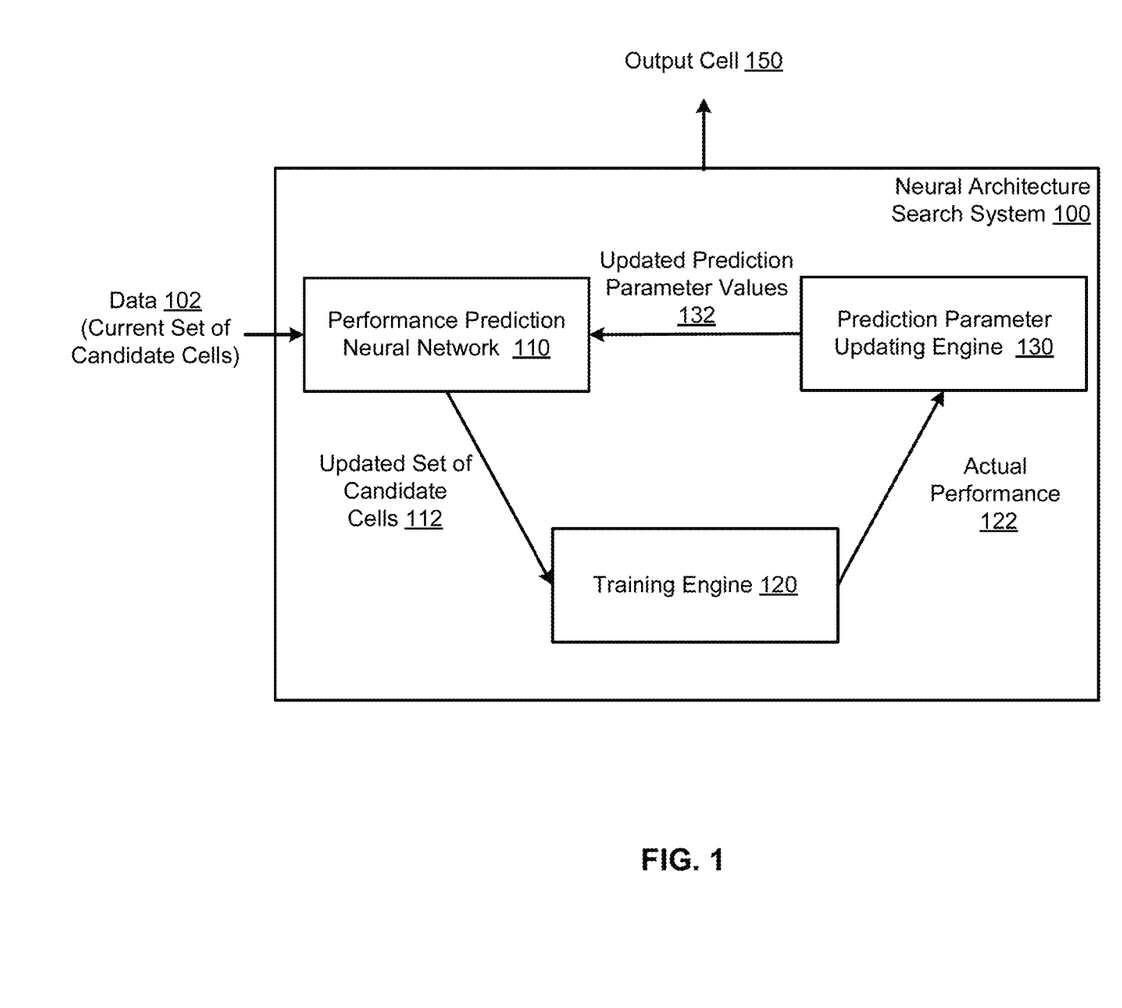
FIG. 1 shows an architecture of an example neural architecture search (NAS) system.

FIG. 1 shows an example neural architecture search (NAS) system 100. The neural architecture search system 100 is an example of a system implemented as computer programs on one or more computers in one or more locations, in which the systems, components, and techniques described below can be implemented.

In some implementations, the NAS system 100 is configured to determine a network architecture for a task neural network by determining an architecture for an output cell 150 that is repeated throughout the network architecture. That is, the task neural network includes multiple instances of the output cell 150. The number of filters of convolutional operations within the instances of the output cell 150 may differ based on a position of the instances within the task neural network. In some cases, the task neural network includes a stack of multiple instances of the output cells 150. In some cases, in addition to the stacked of output cells, the task neural network includes one or more other neural network layers, e.g., an output layer and/or one or more other types of layers. For example, the task neural network may include a convolutional neural network layer followed by a stack of multiple instances of the output cell followed by a global pooling neural network layer followed by a softmax classification neural network layer. An example architecture of a task neural network is described in more detail below with reference to FIG. 3.

Generally, a cell is a fully convolutional neural network that is configured to receive a cell input and to generate a cell output. In some implementations, the cell output may have a same dimension as the cell input, e.g., the same height (H), width (W), and depth (F). For example, a cell may receive a feature map as input and generate an output feature map having the same dimension as the input feature map. In some other implementations, the cell output may have a dimension different from the dimension of the cell input. For example, when the cell is a fully convolution neural network with stride 2, given that the cell input is a H×W×F tensor, the cell output can be a H'×W'×F' tensor, where H'=H/2, W'=W/2, and F'=2F.

In some cases, a cell includes B operation blocks, where B is a predetermined positive integer. For example, B can be three, five, or ten. Each operation block in the cell receives one or more respective input hidden states, and applies one or more operations on the input hidden states to generate a respective output hidden state.

In some implementations, each of the B operation blocks is configured is configured to apply a first operation to a first input hidden state to the operation block to generate a first output. The operation block is configured to apply a second operation to a second input hidden state to the operation block to generate a second output. The operation block is then configured to apply a combining operation to the first and second outputs to generate an output hidden state for the operation block. The first input hidden state, the second input hidden state, the first operation, the second operation, and the combining operation can be defined by a set of hyperparameters associated with the operation block. For instance, the set of hyperparameters corresponding to the operation block includes the following hyperparameters: a first hyperparameter representing which hidden state is used as the first input hidden state, a second hyperparameter representing which hidden state is used as the second input hidden state, a third hyperparameter representing which operation is used as the first operation, a fourth hyperparameter representing which operation is used as the second operation, and a fifth hyperparameter representing which operation is used as the combing operation to combine the outputs of first operation and the second operation.

An example architecture of a cell is described in more detail below with reference to FIG. 2.

To determine the architecture of the output cell 150, the NAS system 100 includes a performance prediction neural network 110 (also referred to as "the predictor 110") that has a plurality of performance prediction parameters (also referred to in this specification as "prediction parameters"). The predictor 110 is a recurrent neural network that includes one or more recurrent neural network layers. For example, the predictor 110 can be a long short-term memory (LSTM) neural network or a gated recurrent unit (GRU) neural network.

Generally, the predictor 110 is configured to receive data specifying a candidate cell and to process the data in accordance with the prediction parameters to generate a performance prediction that characterizes how well a neural network having the candidate cell would perform after being trained on the particular machine learning task. The data specifying the candidate cell is a sequence of embeddings that define the candidate cell (e.g., embeddings of multiple sets of hyperparameters with each set of hyperparameters defining a respective operation block included in the candidate cell). An embedding as used in this specification is a numeric representation of a hyperparameter, e.g., a vector or other ordered collection of numeric values. The embeddings can be pre-determined or learned as part of training the predictor.

The performance prediction can be, for example, a prediction of the accuracy of the trained neural network. As another example, the performance prediction can include both a predicted mean accuracy and a predicted standard deviation or variance for the accuracy.

In particular, as part of determining the architecture for the output cell 150 that is repeated throughout the network architecture of the task neural network, the NAS system 100 obtains data 102 that specifies a current set of candidate cells for the output cell 150. In some cases, the current set of candidate cells is an initial set of candidate cells. In some other cases, the NAS system 100 obtains cells from a previous iteration and then generates the current set of candidate cells by expanding each of the previous cells, e.g., by adding a respective one or more operation blocks to each of the previous cells.

For each of the candidate cells in the current set, the predictor 110 receives data specifying the candidate cell and processes the data using the performance prediction neural network 110 in accordance with current values of the performance prediction parameters to generate a performance prediction for each candidate cell.

The NAS system 110 then generate an updated set of candidate cells 112 by selecting one or more of the candidate cells in the current set based on the performance predictions for the candidate cells in the current set. That is, the NAS system 110 prunes the current set based on the predictions generated by the performance prediction neural network 110 to generate the updated set. For example, the NAS system 110 selects, from the current set, K candidate cells that have the best performance predictions to include in the updated set 112, where K is a predetermined integer.

To update the values of performance prediction parameters of the predictor 110, the NAS system 110 includes a training engine 120 and a prediction parameter updating engine 130. Generally, the training engine 120 and the prediction parameter updating engine 130 will be implemented as one or more software modules or components, installed on one or more computers in one or more locations. In some cases, one or more computers will be dedicated to a particular engine; in other cases, multiple engines can be installed and running on the same computer or computers.

For each candidate cell in the updated set, the training engine 120 is configured to generate an instance of the task neural network having the candidate cell and to train the instance to perform the particular machine learning task. For example, the training engine 120 generates the instance of the task neural network according to a predetermined template architecture of the task neural network. For instance, the template architecture of the task neural network includes a first neural network layer (e.g., a convolutional layer) followed by a stack of N instances of a cell followed by an output subnetwork (e.g., an output subnetwork that includes a softmax neural network layer).

To train instances of the task neural network, the training engine 120 obtains training data for training the instances on the particular machine learning task and a validation set for evaluating the performance of the trained instances of the task neural network on the particular machine learning task.

The training engine 120 can receive the data for training the instances in any of a variety of ways. For example, in some implementations, the training engine 120 receives training data as an upload from a remote user of the NAS system 100 over a data communication network, e.g., using an application programming interface (API) made available by the NAS system 100.

The training engine 120 evaluates a performance of each trained instance on the particular machine learning task to determine an actual performance 122 of the trained instance. For example, the actual performance can be an accuracy of the trained instance on the validation set as measured by an appropriate accuracy measure. For example, the accuracy can be a classification error rate when the task is a classification task or an intersection over union difference measure when the task is a regression task. As another example, the actual performance can be an average or a maximum of the accuracies of the instance for each of the last two, five, or ten epochs of the training of the instance.

The prediction parameter updating engine 130 uses the actual performances for the trained instances to adjust the values of the performance prediction parameters of the performance prediction neural network 110. In particular, the prediction parameter updating engine 130 adjusts the values of the prediction parameters by training the predictor 110 to accurately predict the actual performance of candidate cells using a conventional supervised learning technique, for example, a stochastic gradient descent (SGD) technique.

By using the predictor 110 to generate a performance prediction for each of the candidate cells in the current set, the NAS system 110 considered all candidate cells in the current set. However, the NAS system 110 only needed to actually train a small number of the candidate cells, i.e., those candidate cells that were selected based on the performance predictions generated by the predictor 110 for inclusion in the updated set. Therefore, the NAS system 110 defines a specific technical implementation which is more computationally efficient (i.e., consumes many fewer computational resources) than existing systems that rely on evaluating the performance of a large number of candidate cells by actually training a network having the candidate cell. This is because training the instances of the task neural network is much more computationally expensive than just predicting their actual performances using the predictor 110. Moreover, in some implementations, the candidate cells selected by the predictor for inclusion in the updated set may be trained and evaluated in parallel, thus allowing the NAS system 100 to determine the output cell faster than traditional systems.

After updating the prediction parameters of the predictor 110, the NAS system 100 expands the candidate cells in the updated set to generate a new set that includes multiple new candidate cells. In particular, the NAS system 100 expands the candidate cells in the updated set by adding, for each of candidate cells in the updated set, a respective new operational block having a respective set of hyperparameters to the candidate cell.

Generally, given that the updated set has N candidate cells, each having b operation blocks, the NAS system 100 generates, for each particular candidate cell in the updated set, a subset of all possible cells with each possible cell having b+1 operation blocks (i.e., by adding a new $(b+1)^{th}$ operation block to the particular candidate cell). The new set is the combination of the subsets of all possible cells having b+1 operation blocks.

In some implementations, the new $(b+1)^{th}$ operation block can be specified by 5 hyperparameters, $(I_1, I_2, O_1, O_2, C)$, where $I_1, I_2 \in \mathcal{I}_{b+1}$ specifies the inputs to new operation block and $\mathcal{I}_{b+1}$ is the set of possible inputs to the new operation block; $O_1, O_2 \in \mathcal{O}$ specifies the operations to apply to input $I_1$ and $I_2$, respectively, where $\mathcal{O}$ is a predetermined operation space; and $C \in \mathcal{C}$ specifies how to combine $O_1$ and $O_2$ to generate a block output $H_{b+1}^c$ for the new operation block, where $\mathcal{C}$ is the set of possible combination operators.

In these implementations, the seach space of possible structures for the $(b+1)^{th}$ operation block is $B_{b+1}$ that has size $|B_{b+1}| = |\mathcal{I}_{b+1}|^2 \times |\mathcal{O}|^2 \times |\mathcal{C}|^2$, where $|\mathcal{I}_{b+1}| = 2+(b+1)-1$, $|\mathcal{O}|$ is the number of operations in the operation space, and $|\mathcal{C}|$ is the number of combination operators in the set $\mathcal{C}$. Therefore, the number of candidate cells in the new set is $N \times |B_{b+1}|$ cells.

The NAS system 100 then sets the new set of candidate cells as the current set of candidate cells and repeats the above process until the candidate cells have a predetermined maximum number of operation blocks.

When the number of operation blocks in each of the candidate cells is equal to the predetermined maximum number of operation blocks, the NAS system 100 selects a new candidate cell corresponding to the trained instance that has the best actual performance as the output cell 150 for the task neural network.

In some implementations, the system 100 provides data specifying the architecture of the output cell, e.g., to a user device over a network, once the output cell 150 has been determined. Instead of or in addition to the providing the data specifying the architecture, the system 100 trains a neural network having the determined output cell 150, e.g., either from scratch or to fine-tune the parameter values generated as a result of training a larger neural network, and then uses the trained neural network to process requests received by users, e.g., through the API provided by the NAS system 100.

While this specification describes searching the space of possible architectures for a cell that is repeated multiple times throughout the task neural network, in some other implementations, the NAS system 100 searches for a portion of the architecture that is not repeated, e.g., through possible architectures for the entire task neural network other than one or more predetermined output layers and, optionally, one or more predetermined input layers.

Figure 2:
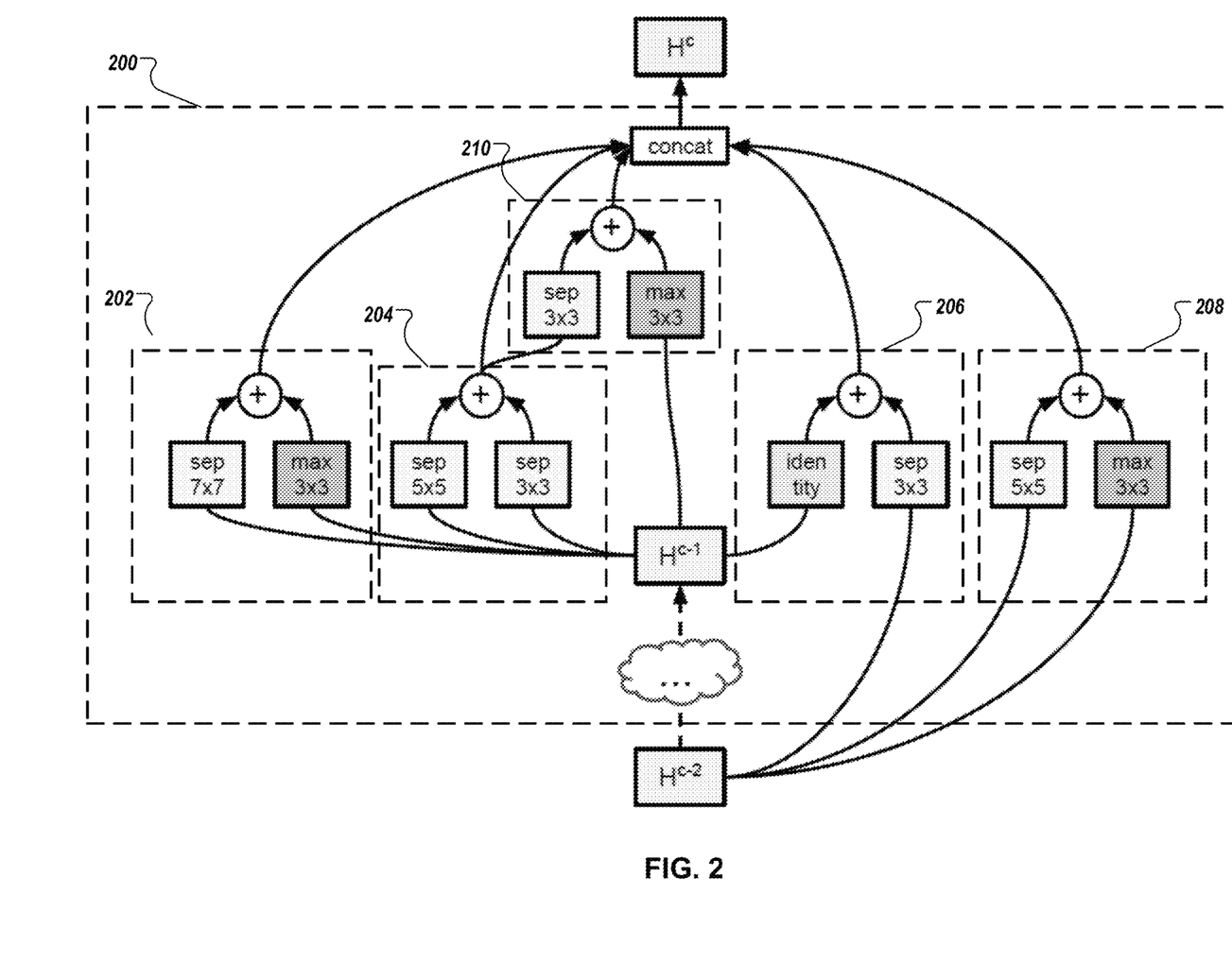
FIG. 2 illustrates an architecture of an example cell of a task neural network.

FIG. 2 illustrates an architecture of an example cell 200 that can be used to construct a task neural network.

The cell 200 is a fully convolutional neural network that is configured to process a cell input (e.g., a H×W×F tensor) to generate a cell output (e.g., H'×W'×F' tensor).

In some implementations, for example when the cell 200 is a fully convolutional neural network with stride 1, the cell output may have a same dimension as the cell input (e.g., H'=H, W'=W and F'=F). In some other implementations, the cell output may have a dimension different from the dimension of the cell input. For example, when the cell is a fully convolution neural network with stride 2, given that the cell input is a H×W×F tensor, the cell output can be a H'×W'×F' tensor, where H'=H/2, W'=W/2, and F'=2F.

The cell 200 includes a plurality of operation blocks (B blocks). For example, as shown in FIG. 2, the cell 200 includes 5 blocks: blocks 202, 204, 206, 208, and 210.

Each block b in the cell 200 can be specified by 5 hyperparameters, $(I_1, I_2, O_1, O_2, C)$, where $I_1, I_2 \in \mathcal{I}_b$ specifies the inputs to block b; $O_1, O_2 \in \mathcal{O}$ specifies the operations to apply to input $I_1$ and $I_1$, respectively, where $\mathcal{O}$ is an operation space; and $C \in \mathcal{C}$ specifies how to combine $O_1$ and $O_2$ to generate a block output $H_b^c$ for block b, where $\mathcal{C}$ is the set of possible combination operators.

The set of possible inputs, $\mathcal{I}_b$, is the set of all previous blocks in the cell 200, $\{H_b^c, \ldots, H_{b-1}^c\}$, plus the output of the previous cell, $H_B^{c-1}$, plus the output of the cell preceding the previous cell, $H_B^{c-2}$.

The operation space $\mathcal{O}$ may include, but not be limited to, the following operations: 3×3 depthwise-separable convolution, 5×5 depthwise-separable convolution, 7×7 depthwise-separable convolution, 1×7 followed by 7×1 convolution, identity, 3×3 average pooling, 3×3 max pooling, and 3×3 dilated convolution.

In some implementations, the set of possible combination operators $\mathcal{C}$ includes an addition operation and a concatenation operation.

In some implementations, the set of possible combination operators $\mathcal{C}$ includes only an addition operation. In these implementations, each block b of the cell 200 can be specified by 4 hyperparameters $(I_1, I_2, O_1, O_2)$.

After each block b generates a block output, the block outputs of all blocks are combined, e.g., concatenated, summed, or averaged, to generate a cell output $H^c$ for the cell 200.

Figure 3:
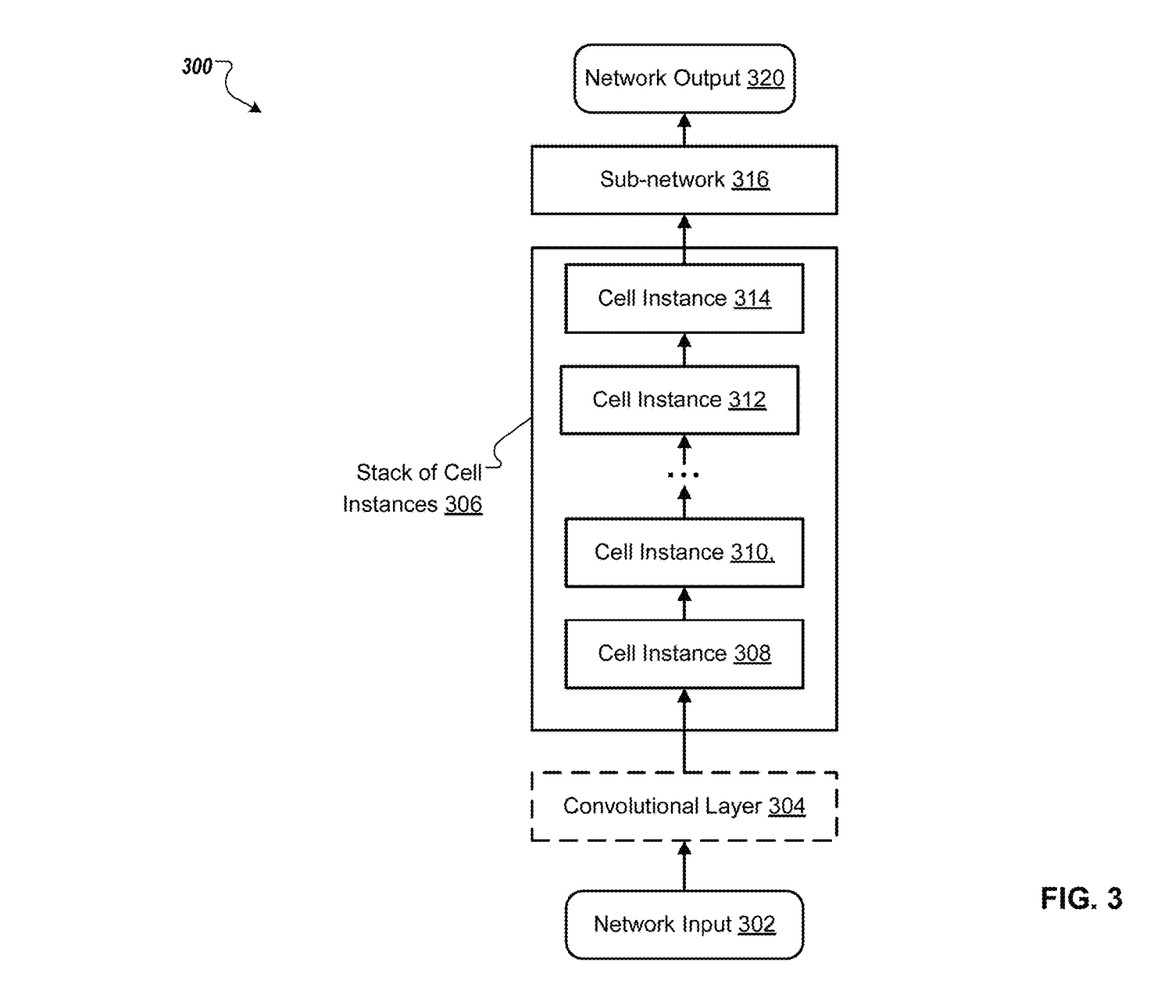
FIG. 3 shows an architecture of an example task neural network.

FIG. 3 shows an architecture of an example task neural network 300. The task neural network 300 is configured to receive a network input 302 and to generate a network output 320 for the input 302.

The task neural network 300 includes a stack of cell instances 306. The stack 306 includes multiple instances of a cell that are stacked one after the other. The cell instances in the stack 306 may have the same structure but different parameter values. The number of filters of convolutional operations within the cell instances in the stack 306 may differ based on a position of the instances within the stack. For example, in one implementation, the cell instance 308 is a stride-2 cell and the cell instance 310 is a stride-1 cell. In such implementation, the cell instance 308 has twice as many filters as the cell instance 310 has.

The first cell instance 308 in the stack 306 is configured to receive a first cell input and to process the first cell input to generate a first cell output.

In some cases, the first cell input is a network input 302 of the task neural network.

In some other cases, the network input 302 is an image and the task neural network 300 may include a convolutional neural network layer 304 preceding the stack of cells 306 in order to reduce computational costs associated with processing the image. For example, the convolutional neural network layer 304 is a 3×3 convolutional filter layer with stride 2. In these cases, the convolutional neural network layer 304 is configured to process the network input 302 to generate an intermediate output to be provided as the first cell input to the cell instance 308.

Each cell instance following the first cell instance (e.g., cell instances 310-312) is configured to receive as input the cell output of the previous cell instance and to generate a respective cell output that is fed as input to the next cell instance. The output of the stack 306 is the cell output of the last cell instance 314.

The task neural network 300 includes a sub-network 316 following the stack of cell instances 306. The sub-network 316 is configured to receive as input the output of the stack of cell instances 306 and to process the output of the stack 306 to generate the network output 320. As an example, the sub-network 316 includes a global pooling neural network layer followed by a softmax classification neural network layer.

Figure 4:
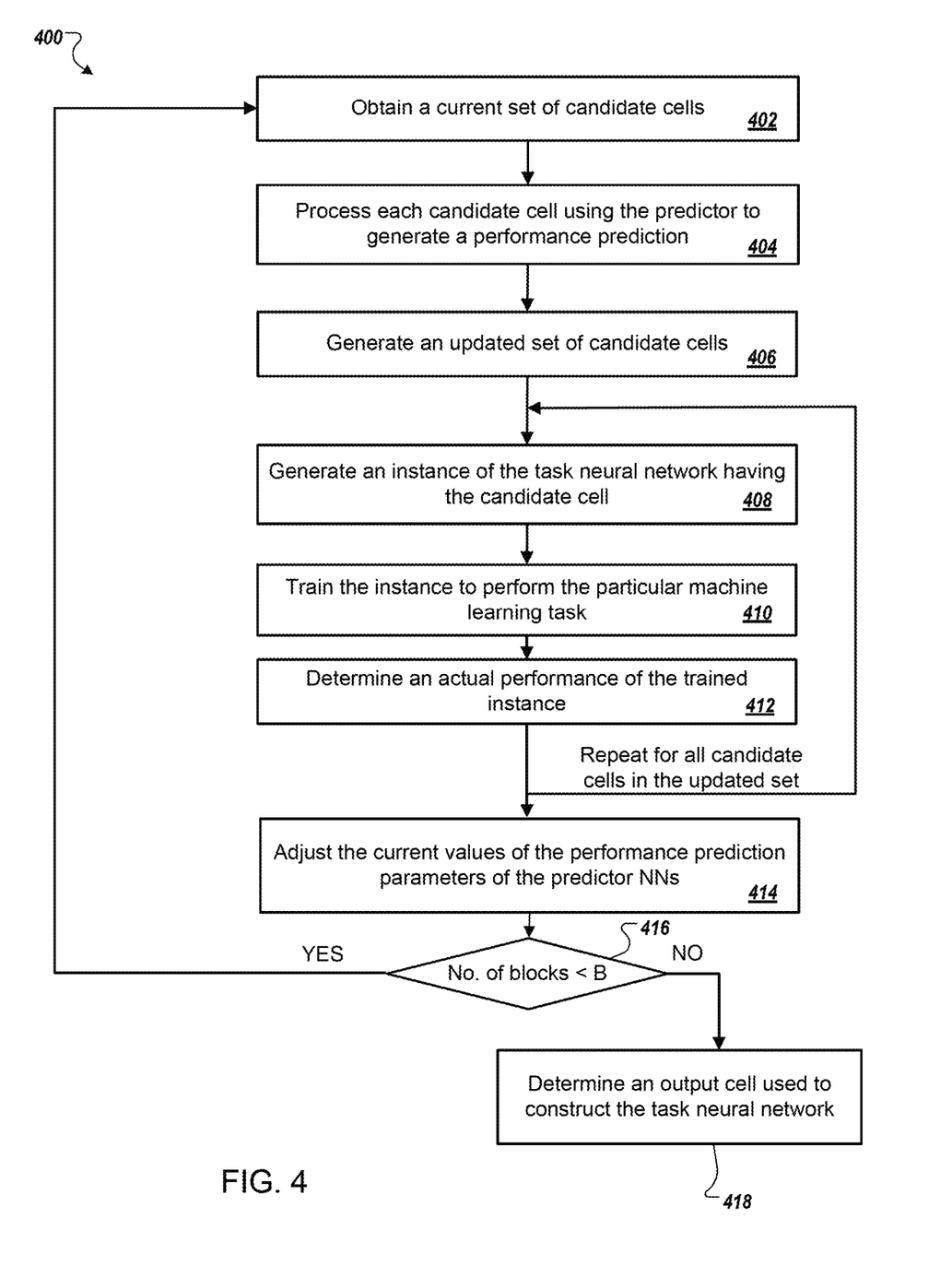
FIG. 4 is a flow diagram of an example process for determining the architecture of an output cell.

FIG. 4 is a flow diagram of an example process 400 for determining the architecture of a cell that is repeated throughout a task neural network. For convenience, the process 400 will be described as being performed by a system of one or more computers located in one or more locations. For example, a neural architecture search system, e.g., the neural architecture search system 100 of FIG. 1, appropriately programmed in accordance with this specification, can perform the process 400.

The system obtains data specifying a current set of candidate cells for an output cell that is used to construct the task neural network (step 402).

In some cases, the current set of candidate cells is an initial set of candidate cells. In some other cases, the system obtains cells from the previous iteration and then generates the current set of candidate cells by expanding each of the previous cells, e.g., by adding a respective one or more operation blocks to each of the previous cells.

The system processes the data specifying the candidate cell using a performance prediction neural network having a plurality of performance prediction parameters (step 404). The performance prediction neural network is configured to process the data specifying the candidate cell in accordance with current values of the performance prediction parameters to generate a performance prediction that characterizes how well a neural network having the candidate cell would perform after being trained on the particular machine learning task.

The system generates an updated set of candidate cells by selecting one or more of the candidate cells in the current set based on the performance predictions for the candidate cells in the current set (step 406). That is, the system prunes the current set based on the predictions generated by the performance prediction neural network to generate the updated set. For example, the system selects, from the current set, K candidate cells that have the best performance predictions to include in the updated set, where K is a predetermined integer.

The system iteratively performs steps 408-412 for each of the candidate cells in the current set as follows.

The system generates an instance of the task neural network having the candidate cell (step 408). For example, the system generates the instance of the task neural network according to a predetermined template architecture of the task neural network. For instance, the template architecture of the task neural network includes a first neural network layer (e.g., a convolutional layer) followed by a stack of N instances of a cell followed by an output subnetwork (e.g., an output subnetwork that includes a softmax neural network layer).

The system trains the instance to perform the particular machine learning task (step 410).

To train instances of the task neural network, the system obtains training data for training the instances on the particular machine learning task and a validation set for evaluating the performance of the trained instances of the task neural network on the particular machine learning task. The system then trains the instance on the training data using conventional machine learning training techniques.

The system then evaluates the performance of each trained instance on the particular machine learning task to determine an actual performance of the trained instance, e.g., by measuring the accuracy of the trained instance on the validation data set (step 412).

Once the system has repeated steps 408-412 for all candidate cells in the current set, the system uses the actual performances for the trained instances to adjust the values of the performance prediction parameters of the performance prediction neural network (step 414).

In particular, the system adjusts the values of the prediction parameters by training the performance prediction neural network to accurately predict the actual performance of candidate cells using a conventional supervised learning technique, for example, a stochastic gradient descent (SGD) technique.

The system then determines whether the number of operation blocks in each of the candidate cells in the updated set is less than a predetermined maximum number of operation blocks allowed in a cell (step 416).

When the number of operation blocks in each of the new candidate cells in the new set is less than the predetermined maximum number of operation blocks allowed in a cell, the system expands the candidate cells in the updated set to generate a new set of candidate cells. In particular, the system expands the candidate cells in the updated set by adding, for each of candidate cells in the updated set, a respective new operational block having a respective set of hyperparameters to the candidate cell. The system then sets this new set of candidate cells as the current set of candidate cells and repeats steps 402-416 until the number of operation blocks in each candidate cell is equal to the maximum number of operation blocks.

When the number of operation blocks in each of the candidate cells in the updated set is equal to the predetermined maximum number of operation blocks, the system selects a new candidate cell corresponding to the trained instance that has the best actual performance as the output cell that is repeated throughout the architecture of the task neural network (step 418).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, specialpurpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   determining an architecture for a task neural network that is configured to perform a particular machine learning task, comprising:
      obtaining data specifying a current set of candidate architectures for the task neural network;
      for each candidate architecture in the current set:
         generating an input that specifies the candidate architecture;
         processing the input that specifies the candidate architecture using a performance prediction neural network having a plurality of performance prediction parameters, wherein the performance prediction neural network is configured to process the input specifying the candidate architecture in accordance with current values of the performance prediction parameters to generate a performance prediction for the candidate architecture without training a candidate task neural network having the candidate architecture on the particular machine learning task, the performance prediction characterizing how well a neural network having the candidate architecture would perform after being trained on the particular machine learning task, wherein the input specifying the candidate architecture is a sequence of embeddings that define the candidate architecture, and wherein the performance prediction neural network is a recurrent neural network;
      generating an updated set of candidate architectures by selecting one or more of the candidate architectures in the current set based on the performance predictions for the candidate architectures in the current set; and
      for each candidate architecture in the updated set,
         generating an instance of the task neural network having the candidate architecture;
         training the instance to perform the particular machine learning task; and
         evaluating a performance of the trained instance on the particular machine learning task to determine an actual performance of the trained instance; and
      using the actual performances for the trained instances to adjust the current values of the performance prediction parameters of the performance prediction neural network using supervised learning.

2. The method of claim 1, wherein the particular machine learning task comprises image processing.

3. The method of claim 1, wherein the particular machine learning task comprises image or video classification.

4. The method of claim 1, wherein the particular machine learning task comprises speech recognition.

5. The method of claim 1, further comprising:
   training a task neural network having the determined architecture; and
   using the trained task neural network having the determined architecture to perform the particular machine learning task on received network inputs.

6. The method of claim 1, further comprising:
   for each candidate architecture in the updated set:
      generating a plurality of new candidate architectures from the candidate architecture by, for each new candidate architecture, adding a respective set of one or more operations to the candidate architecture;
   for each new candidate architecture:
      processing data specifying the new candidate architecture using the performance prediction neural network and in accordance with the updated values of the performance prediction parameters to generate a performance prediction for the new candidate architecture; and
   generating a new set of candidate architectures by selecting one or more of the new candidate architectures based on the performance predictions for the new candidate architectures.

7. The method of claim 6, further comprising:
   selecting one of the new candidate architectures in the new set as the architecture for the task neural network.

8. The method of claim 7, wherein the selecting comprises:
   for each new candidate architecture in the new set:
      generating an instance of the task neural network having the new candidate architecture;
      training the instance to perform the particular machine learning task; and
      evaluating a performance of the trained instance on the particular machine learning task to determine an actual performance of the trained instance; and
   selecting a new candidate architecture corresponding to the trained instance having the best actual performance as the architecture for the task neural network.

9. The method of claim 6, wherein the architecture for the task neural network comprises a plurality of convolutional cells that each share one or more hyperparameters, each of the plurality of convolutional cells comprising one or more operation blocks that each receive one or more respective input hidden states and generate a respective output hidden state, and wherein each candidate architecture and each new candidate architecture defines values for the hyperparameters that are shared by each convolutional cell.

10. The method of claim 9, wherein each candidate architecture defines an architecture for a convolutional cell having a first number of operation blocks, and wherein generating a plurality of new candidate architectures from the candidate architecture by, for each new candidate architecture, adding a respective set of one or more operations to the candidate architecture comprises:
adding, for each new candidate cell, a new operational block having respective hyperparameters to the candidate architecture.

11. The method of claim 1, wherein the performance prediction is an output of the recurrent neural network after processing a last embedding in the sequence of embeddings.

12. A system comprising one or more computers and one or more storage devices storing instructions that, when executed by the one or more computers, cause the one or more computers to perform operations comprising:
determining an architecture for a task neural network that is configured to perform a particular machine learning task, comprising:
obtaining data specifying a current set of candidate architectures for the task neural network;
for each candidate architecture in the current set:
generating an input that specifies the candidate architecture;
processing the input that specifies the candidate architecture using a performance prediction neural network having a plurality of performance prediction parameters, wherein the performance prediction neural network is configured to process the input specifying the candidate architecture in accordance with current values of the performance prediction parameters to generate a performance prediction for the candidate architecture without training a candidate task neural network having the candidate architecture on the particular machine learning task, the performance prediction characterizing how well a neural network having the candidate architecture would perform after being trained on the particular machine learning task, wherein the input specifying the candidate architecture is a sequence of embeddings that define the candidate architecture, and wherein the performance prediction neural network is a recurrent neural network;
generating an updated set of candidate architectures by selecting one or more of the candidate architectures in the current set based on the performance predictions for the candidate architectures in the current set; and
for each candidate architecture in the updated set,
generating an instance of the task neural network having the candidate architecture;
training the instance to perform the particular machine learning task; and
evaluating a performance of the trained instance on the particular machine learning task to determine an actual performance of the trained instance; and
using the actual performances for the trained instances to adjust the current values of the performance prediction parameters of the performance prediction neural network using supervised learning.

13. The system of claim 12, wherein the operations further comprise:
training a task neural network having the determined architecture; and
using the trained task neural network having the determined architecture to perform the particular machine learning task on received network inputs.

14. The system of claim 12, wherein the operations further comprise:

for each candidate architecture in the updated set:
generating a plurality of new candidate architectures from the candidate architecture by, for each new candidate architecture, adding a respective set of one or more operations to the candidate architecture;
for each new candidate architecture:
processing data specifying the new candidate architecture using the performance prediction neural network and in accordance with the updated values of the performance prediction parameters to generate a performance prediction for the new candidate architecture; and
generating a new set of candidate architectures by selecting one or more of the new candidate architectures based on the performance predictions for the new candidate architectures.

15. The system of claim 14, wherein the operations further comprise:
selecting one of the new candidate architectures in the new set as the architecture for the task neural network.

16. The system of claim 15, wherein the operations for selecting one of the new candidate architectures in the new set as the architecture for the task neural network comprise:
for each new candidate architecture in the new set:
generating an instance of the task neural network having the new candidate architecture;
training the instance to perform the particular machine learning task; and
evaluating a performance of the trained instance on the particular machine learning task to determine an actual performance of the trained instance; and
selecting a new candidate architecture corresponding to the trained instance having the best actual performance as the architecture for the task neural network.

17. The system of claim 14, wherein the architecture for the task neural network comprises a plurality of convolutional cells that each share one or more hyperparameters, each of the plurality of convolutional cells comprising one or more operation blocks that each receive one or more respective input hidden states and generate a respective output hidden state, and wherein each candidate architecture and each new candidate architecture defines values for the hyperparameters that are shared by each convolutional cell.

18. The system of claim 17, wherein each candidate architecture defines an architecture for a convolutional cell having a first number of operation blocks, and wherein the operations for generating a plurality of new candidate architectures from the candidate architecture by, for each new candidate architecture, adding a respective set of one or more operations to the candidate architecture comprise:
adding, for each new candidate cell, a new operational block having respective hyperparameters to the candidate architecture.

19. The system of claim 12, wherein the performance prediction is an output of the recurrent neural network after processing a last embedding in the sequence of embeddings.

20. One or more non-transitory computer storage media storing instructions that when executed by one or more computers cause the one or more computers to perform operations comprising:
determining an architecture for a task neural network that is configured to perform a particular machine learning task, comprising:
obtaining data specifying a current set of candidate architectures for the task neural network;

for each candidate architecture in the current set:
　generating an input that specifies the candidate architecture;
　　processing the input that specifies the candidate architecture using a performance prediction neural network having a plurality of performance prediction parameters, wherein the performance prediction neural network is configured to process the input specifying the candidate architecture in accordance with current values of the performance prediction parameters to generate a performance prediction for the candidate architecture without training a candidate task neural network having the candidate architecture on the particular machine learning task, the performance prediction characterizing how well a neural network having the candidate architecture would perform after being trained on the particular machine learning task, wherein the input specifying the candidate architecture is a sequence of embeddings that define the candidate architecture, and wherein the performance prediction neural network is a recurrent neural network;
generating an updated set of candidate architectures by selecting one or more of the candidate architectures in the current set based on the performance predictions for the candidate architectures in the current set; and
for each candidate architecture in the updated set,
　generating an instance of the task neural network having the candidate architecture;
　training the instance to perform the particular machine learning task; and
　evaluating a performance of the trained instance on the particular machine learning task to determine an actual performance of the trained instance; and
using the actual performances for the trained instances to adjust the current values of the performance prediction parameters of the performance prediction neural network using supervised learning.

\* \* \* \* \*